United States Patent [19]

Arimoto

[11] Patent Number: 5,465,170
[45] Date of Patent: Nov. 7, 1995

[54] ALIGNMENT ADJUSTING SYSTEM FOR USE IN OPTICAL SYSTEM OF OPTICAL TRANSCEIVER

[75] Inventor: Yoshinori Arimoto, Kokubunji, Japan

[73] Assignee: ATR Optical and Radio Communications Research Lab., Kyoto, Japan

[21] Appl. No.: 183,416

[22] Filed: Jan. 19, 1994

[30] Foreign Application Priority Data

Jan. 19, 1993 [JP] Japan .................................. 5-006526

[51] Int. Cl.⁶ ............................................... H04B 10/00
[52] U.S. Cl. ......................................... 359/159; 359/152
[58] Field of Search .................... 359/159, 172, 359/152

[56] References Cited

U.S. PATENT DOCUMENTS

| | | | |
|---|---|---|---|
| 4,439,012 | 3/1984 | Christy | 350/294 |
| 4,596,050 | 6/1986 | Rogers | 359/163 |
| 4,867,560 | 9/1989 | Kunitsugu | 359/159 |
| 5,060,304 | 10/1991 | Solinsky | 359/159 |
| 5,070,353 | 12/1991 | Komiya et al. | 354/402 |
| 5,347,387 | 9/1994 | Rice | 359/159 |

FOREIGN PATENT DOCUMENTS 5963804  4/1984  Japan .

OTHER PUBLICATIONS

Auer, "Pointing, Acquisition and Tracking for Intersatellite Optical Data Links", *ESA SP-202*, May 1984, pp. 131–136.
"Optical Antenna Gain", Klein et al., Applied Optics, vol. 13, No. 9, Sep. 1974, pp. 2134–2141.
"A New Telescope Concept for Space Communication", Henneberg, et al., SPIE, vol. 1218, Jan. 1990, pp. 153–159.
"NASA's Flight-Technology Development Program", Hayden et al., SPIE vol. 1417, Jan. 1991, pp. 182–199.
"An Active Alignment Method for Post Launch Co–Alignment of Laser Beam Combiner Systems" Yu et al. SPIE, vol. 1635, Jan. 1992.
"Optical Pupil Relay Design for Silex; Optimising Wavefront Error and Transmit/Receive Beams Co–Alignment", Jonas et al., SPIE, vol. 1635, Jan. 1992, pp. 99–108.
"NASA/GSFC Program in Direct Detection Optical . . . ", Fitzmaurice et al., SPIE vol. 1131, Optical Space Communications, 1989, pp. 10–23.
"The Silex Optical Interorbit Link Experiment", Electronics & Communications Journal 3 (1991), Dec., No. 6, pp. 273–279.
"Optical Intersatellite Links", Electronics & Communication Journal 3 (1991) Dec., No. 6, pp. 280–288.

*Primary Examiner*—Leo H. Boudreau
*Assistant Examiner*—Bhavesh Mehta
*Attorney, Agent, or Firm*—Birch, Stewart, Kolasch & Birch

[57] ABSTRACT

An alignment adjusting system for use in an optical system in an optical transceiver includes an optical antenna having a main mirror and a submirror, both of which are provided around an optical axis of the optical antenna. An optical coupling unit couples the optical antenna to the optical transceiver. The optical antenna transmits a beam of transmitting light output from the optical transceiver to an optical antenna of a destination station after sequentially reflecting the beam of transmitting light by the submirror and the main mirror. A return-reflection mirror provided in either one of the main mirror and the submirror return-reflects a part of the beam of transmitting light. A photodetector detects a defocusing amount of the beam of transmitting light in the optical antenna in response to the beam of transmitting light return-reflected, and a moving mechanism moves the submirror in a direction parallel to the optical axis of the optical antenna, Further, a controller controls the moving mechanism so that the defocusing amount of the beam of transmitting light becomes substantially zero, in response to the defocusing amount of the beam of transmitting light.

7 Claims, 6 Drawing Sheets

ALIGNMENT ADJUSTING SYSTEM FOR USE IN OPTICAL SYSTEM OF OPTICAL TRANSCEIVER

BACKGROUND OF THE INVENTION

1. Field of the Invention

The present invention relates to an alignment adjusting system for use in an optical system of an optical transceiver, in particular, which is used for intersatellite communications.

2. Description of the Related Art

Conventionally, optical communications using a beam of laser light have the following features:

(a) since the wavelength of the laser light is smaller than one thousandth that of the microwave, antennas and transceivers can be downsized;

(b) since a wider frequency band can be used, communications with a lager capacity can be performed in a higher speed; and (c) since sharp laser beams are used, mutual interference among them can be neglected.

However, to make the best use of the above features, it is necessary to direct sharper laser beam to an antenna of the destination station with higher accuracy. For example, in an optical communication between a geostationary satellite and a low-earth-orbiting satellite, it is necessary to provide an optical antenna having an aperture diameter aperture of about 20 cm. When a conventionally used semiconductor laser light with a wavelength of 0.83 µm is used, the half-width of a beam of transmitting laser light becomes approximately 5 micro-radian. In this case, pointing and tracking with an accuracy of 1 micro-radian or less is required to maintain a stable optical communication. Further, for an optical transceiver to be provided in a low-earth-orbiting satellite, it is necessary to provide a wider directivity range over $2\pi$ steradian or more in solid angle in the sphere.

In a conventional pointing and tracking system, in order to simultaneously obtain a wider angle range and a higher tracking accuracy, there has been used a control system having a double feedback loop, comprising:

(a) a coarse tracking system having a relatively slow response speed but having a wider field of view, wherein the coarse tracking system comprises a CCD sensor, and two-axes gimbals for controlling an optical antenna with two directions; and (b) a fine tracking system having a narrower field of view but having a higher speed response, wherein the fine tracking system comprises a quadrant detector sensor (hereinafter, referred to as a QD sensor) composed of four photodiode cells divided into four quadrants, and a fine pointing mirror module (hereinafter, referred to as an FPM).

Besides, a conventional center-fed cassegrain type optical antenna comprises a main mirror consisting of a concave parabolic mirror, and a submirror consisting of a convex hyperbolic mirror. In the center-fed cassegrain type optical antenna, after a beam of transmitting laser light outputted from an optical transceiver is led to the submirror through a hole formed in the center of the main mirror, the beam of laser light is reflected by the submirror, and then is reflected by the main mirror. Thereafter, the beam of transmitting laser light is transmitted to an optical antenna of a destination station.

Further, in a conventional pointing, acquisition and tracking control system, the initial acquisition is performed by receiving a beacon light having a wider field of view transmitted from a satellite of a destination station. In this case, a CCD sensor is used as the acquisition sensor, and then an error from the tracking center of the luminescent spot of the beacon light which is outputted from the CCD sensor is detected. Thereafter, based on the detected error, the two-axes gimbals mechanically connected with the optical antenna are controlled to be driven, so that the optical antenna is directed to the satellite of the destination station. The beacon light is then captured within the field of view of the QD sensor, and thereafter, tracking errors in two directions perpendicular to each other are detected based on a relative ratio of amounts of light incident on the respective photodiode cells of the QD sensor. Based on the tracking errors, the driving mechanism of the FPM is controlled to be driven so that a beam of laser light transmitted from the satellite of the destination station is captured within the field of view of a receiving photodiode sensor (hereinafter, photodiode sensor will be referred to as a PD sensor). Further, a point-ahead mirror module (hereinafter, referred to as a PAM) is used to correct a point-ahead angle of a beam of transmitting laser light so as to be substantially zero, namely, to accurately illuminate the destination station, which will be described in detail later. Then, a beam of laser light is transmitted in the corrected direction toward the optical antenna of the destination station, and then the optical communication is started.

To maintain the tracking accuracy under severe environments such as a large vibration at the launching of the satellite, a large variation in the ambient temperature, so that optical communication can be carried out, it is necessary to provide 1 µm or less alignment accuracy for arrangement of devices of the optical system including mirrors and lenses. For this reason, conventionally, by using Invar (trademark: Ni-based alloy) or Zerodur (trademark: glass ceramic material), each of which has a small thermal expansion coefficient and has established performance results as a material constituting precision optical equipment, such design has been implemented that arrangement of optical devices will not change due to change in temperature.

However, there have been such problems that the above-mentioned Invar has a relatively large specific gravity while the above-mentioned Zerodur encounters difficulty in processing the same into a complex shape.

Suited for structural materials for optical transceiver to be provided in the satellite are light-weight metal materials with a specific gravity as small as possible and a thermal conductivity as large as possible, such as Al, Mg, Be or the like. However, the light-weight metal materials, in general, have relatively large thermal expansion coefficients, respectively, and therefore, it is necessary to provide an alignment adjustment mechanism for compensating for alignment errors in equipment arrangement due to thermal expansion in order to achieve optical communications. However, there has been provided no proper method for adjusting alignment of the optical transceiver after launching of the satellite. Even if such adjustment is made possible in some way, severe demand for accuracy would cause the optical transceiver provided comprising an optical antenna to be relatively large sized because of the provision of the alignment adjustment mechanism, disadvantageously.

SUMMARY OF THE INVENTION

An essential object of the present invention is therefore to provide an alignment adjusting system for use in an optical system of an optical transceiver, having a smaller size and a smaller weight than those of the conventional apparatuses, and being capable of adjusting the arrangement of the optical system with higher accuracy.

In order to achieve the aforementioned objective, according to one aspect of the present invention, there is provided an alignment adjusting system for use in an optical system in an optical transceiver, comprising:

an optical antenna having a main mirror and a submirror, both of which being provided around an optical axis of said optical antenna and away from each other by a predetermined interval, said optical antenna transmitting a beam of transmitting light outputted from said optical transceiver to an optical antenna of a destination station after sequentially reflecting said beam of transmitting light by said submirror and said main mirror;

an optical coupling means for optically coupling said optical antenna to said optical transceiver;

a return-reflection mirror for return-reflecting a part of said beam of transmitting light, said return-reflection mirror being provided in either one of said main mirror and said submirror;

first detection means for detecting a defocusing amount of said beam of transmitting light in said optical antenna, in response to said beam of transmitting light return-reflected by said return-reflection mirror;

first moving means for moving said submirror in a direction parallel to the optical axis of said optical antenna; and first control means for controlling said first moving means so that the defocusing amount of said beam of transmitting light becomes substantially zero, in response to a defocusing amount of said beam of transmitting light in said optical antenna which is detected by said first detection means.

By the arrangement of the above-mentioned invention, when the reflection mirror for return-reflecting a beam of transmitting light is provided in the main mirror, the defocusing amount of the beam of transmitting laser light can be corrected so as to be substantially zero over the optical system from the optical transceiver through the optical coupling or connection means to the submirror and the main mirror of the optical antenna. On the other hand, when the reflection mirror for return-reflecting a beam of transmitting light is provided in the submirror, the defocusing amount of the beam of transmitting laser light can be corrected so as to be substantially zero over the optical system from the transceiver through the optical coupling or connection means to the submirror of the optical antenna. As a result, the size of the alignment adjusting system for use in the optical system in the optical transceiver of the present invention can be made smaller and the weight thereof can be made smaller than those of the conventional apparatuses, and further the present invention is capable of adjusting arrangement of the optical system located from the optical transceiver through the optical coupling or connection means to the submirror or the main mirror of the optical antenna with a higher accuracy. The provision of the alignment adjusting system allows the main mirror and the submirror to be made of light-weight metal materials each having a relatively smaller specific gravity and a relatively larger thermal conductivity, such as Al, Mg, Be or the like. Accordingly, the weight of the satellite in which the optical transceiver is provided can be advantageously and remarkably reduced.

Further, in the above-mentioned alignment adjusting system, said optical antenna sequentially reflects a beam of received light received from said optical antenna of said destination station by said main mirror and said submirror, and thereafter, outputs said beam of reflected light to said optical transceiver through said optical coupling means; and said alignment adjusting system further comprising:

second detection means for detecting a deviation amount of said beam of transmitting light from the optical axis of said optical antenna, in response to said beam of transmitting light return-reflected by said return-reflection mirror;

third detection means for detecting a deviation amount of said beam of received light from the optical axis of said optical antenna in response to said beam of received light reflected by said submirror;

second moving means for moving the optical axis of said beam of transmitting light transmitting in said optical coupling means, said second moving means being provided in said optical coupling means; and second control means for controlling said second moving means so that the deviation amount of said beam of transmitting light from the optical axis of said optical antenna coincides with the deviation amount of said beam of received light from the optical axis of said optical antenna, in response to the deviation amount of said beam of transmitting light from the optical axis of said optical antenna which is detected by said second detection means and the deviation amount of said beam of received light from the optical axis of said optical antenna which is detected by said third detection means.

By the arrangement of the above-mentioned invention, when the reflection mirror for return-reflecting a beam of transmitting laser light is provided in the main mirror, the deviation amount of the beam of transmitting light from the optical axis of the optical system can be corrected so that the optical axis coincides with that of the beam of received light, over the optical system from the optical transceiver through the optical coupling or connection means to the submirror and the main mirror of the optical antenna. On the other hand, when the reflection mirror for return-reflecting a beam of transmitting light is provided in the submirror, the deviation amount of the beam of transmitting laser light from the optical axis of the optical system can be corrected so that the optical axis of the beam of transmitting light coincides with that of the beam of received light, over the optical system from the optical transceiver through the optical coupling or connection means to the submirror of the optical antenna. Accordingly, the size of the alignment adjusting system for use in the optical system in the optical transceiver of the present invention can be made smaller and the weight thereof can be made smaller than those of the conventional apparatuses, and further the present invention is capable of adjusting arrangement of the optical system from the optical transceiver through the optical coupling or connection means to the submirror or the main mirror of the optical antenna with a higher accuracy.

Further, in the above-mentioned alignment adjusting system, said main mirror is either one of a ring-shaped concave parabolic mirror and a ring-shaped concave nearly-parabolic hyperbolic mirror;

said return-reflection mirror is either one of a ring-shaped concave spherical mirror and a ring-shaped concave nearly-spherical elliptical mirror, said return-reflection mirror being formed integrally together with said main mirror and concentrically with said main mirror around the optical axis of said optical antenna; and said main mirror and said return-reflection mirror are arranged so that a focal point of said main mirror coincides with the center of curvature of said return-reflection mirror.

Still further, in the above-mentioned alignment adjusting system, said main mirror is provided on an outer periphery of a ring-shaped body, while said return-reflection mirror is provided on an inner periphery of said ring-shaped body, and said return-reflection mirror has an optical through hole for passing said beam of transmitting light and said beam of received light therethrough, said optical through hole having a center coinciding with the optical axis of said optical antenna, said optical through hole being formed so as to be concentric with said main mirror around the optical axis of said optical antenna.

Still more further, in the above-mentioned alignment adjusting system, said submirror is a convex hyperbolic mirror, and said return-reflection mirror is either one of a concave spherical mirror and a concave nearly-spherical elliptical mirror which is formed integrally and concentrically with said submirror around the optical axis of said optical antenna.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

A preferred embodiment according to the present invention is described hereinbelow with the accompanying drawings.

Figure 1:
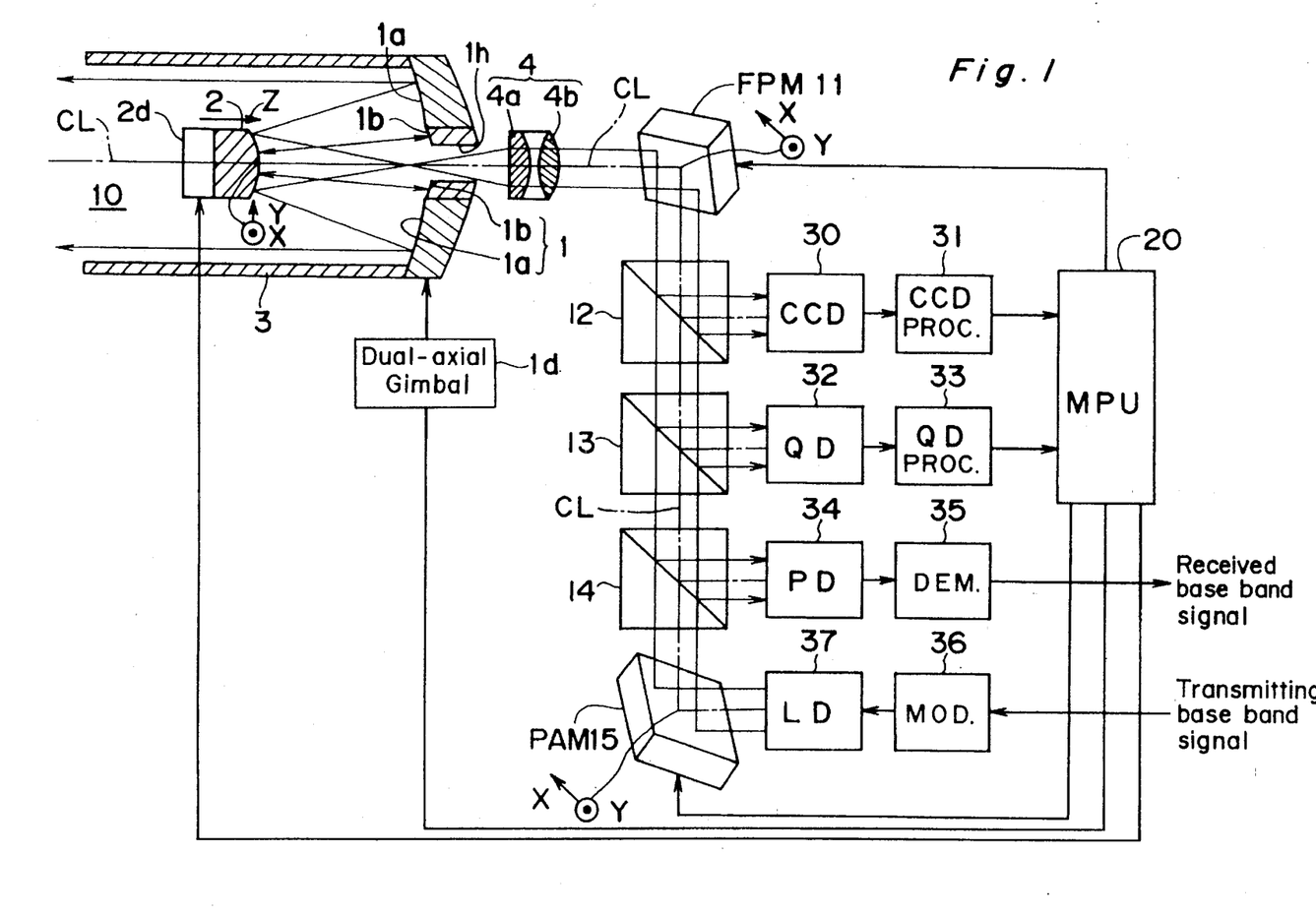
FIG. 1 is a schematic block diagram showing an optical transceiver together with an optical antenna and an adjusting system for an optical system of the optical transceiver of a preferred embodiment according to the present invention.

FIG. 1, showing a preferred embodiment of the present invention, is a schematic block diagram of an optical transceiver comprising an optical antenna 10 and an alignment adjusting system for an optical system for use in optical communications.

Figure 2:
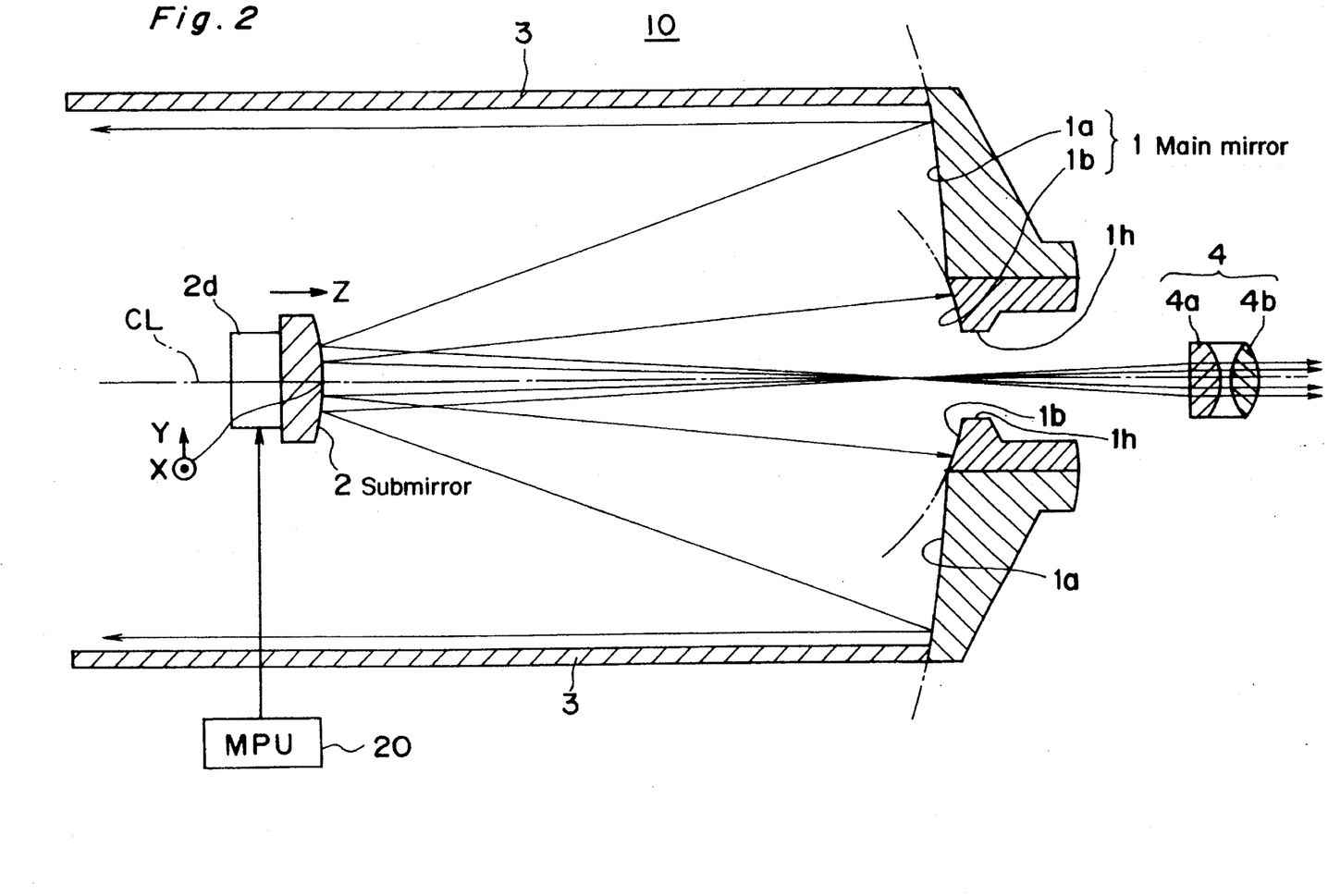
FIG. 2 is a longitudinal cross-sectional view showing details of the optical antenna shown in FIG. 1.

The center-fed cassegrain type optical antenna 10 of the present preferred embodiment, as shown in FIG. 2, comprises the followings:

(a) a main mirror or reflector 1 comprising a ring-shaped concave parabolic mirror 1a for transmitting and receiving beams of lights, and a ring-shaped concave spherical return-reflection mirror or retro-reflector 1b for turn-around-reflecting, retro-reflecting or return-reflecting a beam of transmitting laser light, both of which are provided concentrically around an optical axis CL of the beam of laser light, the parabolic mirror 1a being provided on the outer periphery of the main mirror 1, the concave spherical return-reflection mirror 1b being provided on the inner periphery of the main mirror 1 and having an optical through hole 1h in the center of the concave spherical return-reflection mirror 1b, and both of the parabolic mirror 1a and the spherical return-reflection mirror 1b being formed integrally with each other; and (b) a submirror or subreflector 2 made of a convex hyperbolic mirror provided at a position shifted from the coincident position of the focal point Fp of the parabolic mirror 1a and the center of curvature Rc of the spherical return-reflection mirror 1b (for reference characters Fp and Rc, See FIG. 7) toward the main mirror 1 around the optical axis CL.

In the center-fed cassegrain type optical antenna 10, a beam of transmitting laser light outputted from the optical transceiver is led to the submirror 2 through the optical through hole 1h, and then is sequentially reflected by the submirror 2 and the parabolic mirror 1a of the main mirror 1. Thereafter, a beam of transmitting laser light is transmitted to an optical antenna of a destination station. On the other hand, a beam of transmitting laser light which has been reflected by the submirror 2 is reflected by the spherical return-reflection mirror 1b of the main mirror 1, so as to be returned toward the submirror 2, and then is reflected again by the submirror 2 so as to be incident toward the optical transceiver. Then, based on the beam of returned transmitting laser light (hereinafter, referred to as a beam of returned transmitting laser light), an alignment adjustment for the optical system in the optical transceiver is performed.

In the present preferred embodiment, it is noted that the wavelength of the beam of the transmitting light outputted from a laser diode 37 is slightly different from the wavelength of the beam of received light which is transmitted from the optical transceiver of the destination station and is received by the optical antenna 10 in such a degree that they can be separated by respective optical filters provided in a CCD sensor 30 and a QD sensor (quadrant detector sensor) 32.

Referring to FIG. 2, in the center-fed cassegrain type optical antenna 10, the ring-shaped parabolic mirror 1a for transmitting and receiving beams of laser lights is provided on the outer periphery of the main mirror 1 so as to oppose to the submirror 2, namely, so as to be formed on the surface of the main mirror 1 located on the side toward the direction of reception and transmission of the optical antenna 10. Further, the ring-shaped concave spherical return-reflection mirror 1b for return-reflecting a beam of transmitting laser light, in which an optical through hole 1h of a circular shape is formed having the center the optical axis CL passes through, is provided on the inner periphery of the main mirror 1 so as to oppose to the submirror 2, namely, so as to be formed on the surface of the main mirror 1 located on the side toward the direction of reception and transmission of the optical antenna 10.

In the optical antenna 10, the position of the focal point

Fp of the parabolic mirror 1a and the position of the center of curvature Rc of the spherical return-reflection mirror 1b are located at a point (referred to as a coincident point Fp=Rc hereinafter) so as to coincide with each other. Further, the submirror 2 made of the convex hyperbolic mirror is provided at a position shifted from the coincident position Fp=Rc on the side toward a concave reflection surface of the main mirror 1, for example, See FIG. 7. In the present preferred embodiment, the centers of curvatures of the mirrors 1a and 1b are so set as to be different from each other, and further, a ratio fp/fc of the focal length fp of the parabolic mirror 1a to the focal length fc of the spherical return-reflection mirror 1b is preferably set to a value slightly smaller than 2.

As each of the materials for the main mirror 1 and the submirror 2, optical glass is preferably used, such as the Zerodur or the like, having a relatively smaller thermal expansion coefficient. However, when the alignment adjusting system according to the present invention is provided, this allows the use of light-weight metal materials, such as Al, Mg, Be or the like, having a relatively smaller specific gravity and a relatively larger thermal conductivity, in the application of mounting the alignment adjusting system onto a satellite.

Further, if the two mirrors, that is parabolic mirror and spherical return-reflection mirror, are processed simultaneously by an ultra high-precision machining, mis-alignment between the two mirrors is negligibly small and this good alignment accuracy will be maintained after these mirrors are launched in the space because the above-mentioned larger thermal conductivity will minimize the thermal deformation of the mirrors.

In general, the shape of the mirror surface of the optical antenna 10 can be approximated by an axially symmetrical quadratic surface. Assuming that the radius at any given position of the mirror surface from the optical axis is ρ, the curvature of the center of the quadratic surface is C, and the deformation parameter representing the shape of the quadratic surface is K, then the depth of mirror surface Sag from the intersection (vertex) between the quadratic surface and the optical axis of the mirror surface can be represented by the following equation (1):

$$Sag = (C \cdot \rho^2) / \{1 + (1 - C^{2}\rho^{2}K)^{1/2}\} + a_{6}\rho^{6} + a_{8}\rho^{8} + a_{10}\rho^{10} + \ldots$$

where $a_6$ to $a_{10}$ are coefficients representing higher-order aspherical surfaces, and further the deformation parameter K has the following meanings:

(a) If K<0, then the mirror surface of the main mirror 1 becomes a hyperbolic surface;
(b) If K=0, then the mirror surface of the main mirror 1 becomes a parabolic surface;
(c) If 0<K<1, then the mirror surface of the main mirror 1 becomes an elliptical surface;
(d) If K=1, then the mirror surface of the main mirror 1 becomes a spherical surface; and
(e) If K>1, then the mirror surface of the main mirror 1 becomes an elliptical surface.

Figure 5:
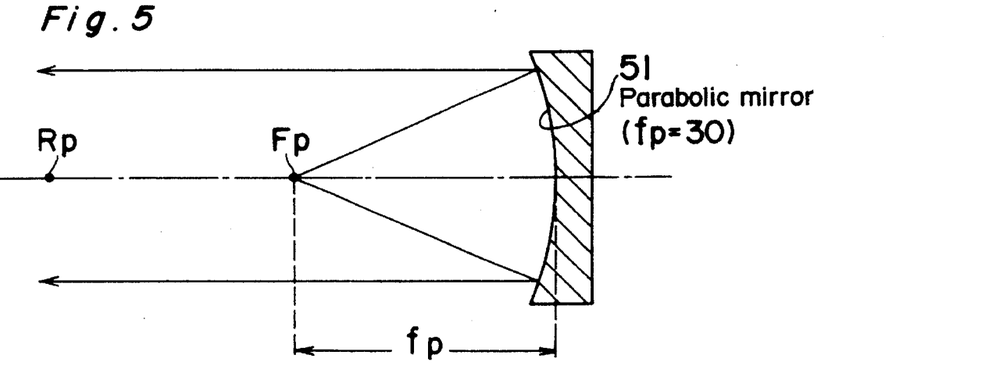
FIG. 5 is a longitudinal cross-sectional view of a convex parabolic mirror showing an action thereof.

For example, when the main mirror 1 is provided comprising only a parabolic mirror 51 having a focal length fp of 30 as shown in FIG. 5, like a conventional optical antenna, a beam of transmitting light transmitted from the focal point Fp toward the parabolic mirror 51 is reflected by the parabolic mirror 51, and then, the transmitting light becomes collimated parallel light, which is then transmitted to the optical antenna of the destination station.

Figure 6:
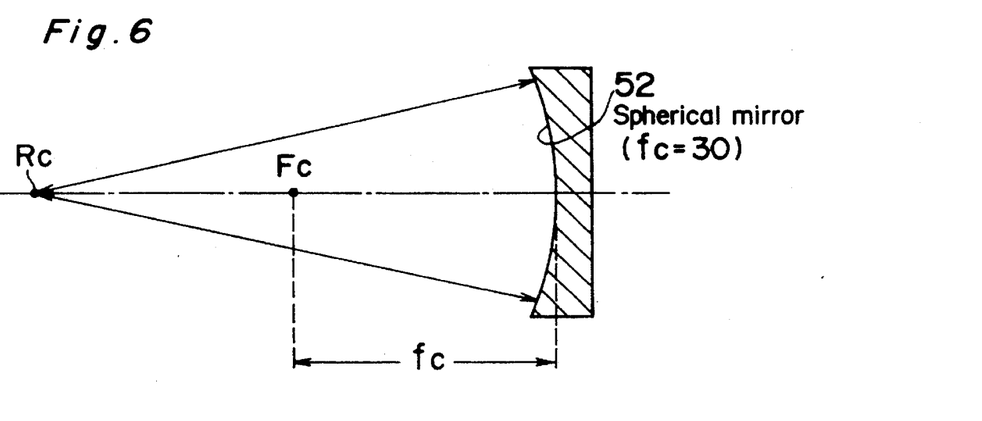
FIG. 6 is a longitudinal cross-sectional view of a convex spherical mirror showing an action thereof.

On the other hand, when the main mirror 1 is provided comprising only a spherical mirror 52 with a focal length fc of 30 as shown in FIG. 6, a beam of transmitting light transmitted from the center of curvature Rc of the spherical mirror 52 toward the spherical mirror 52 is reflected by the spherical mirror 52, and then, it is returned to the center of curvature Rc along the same optical path.

Figure 7:
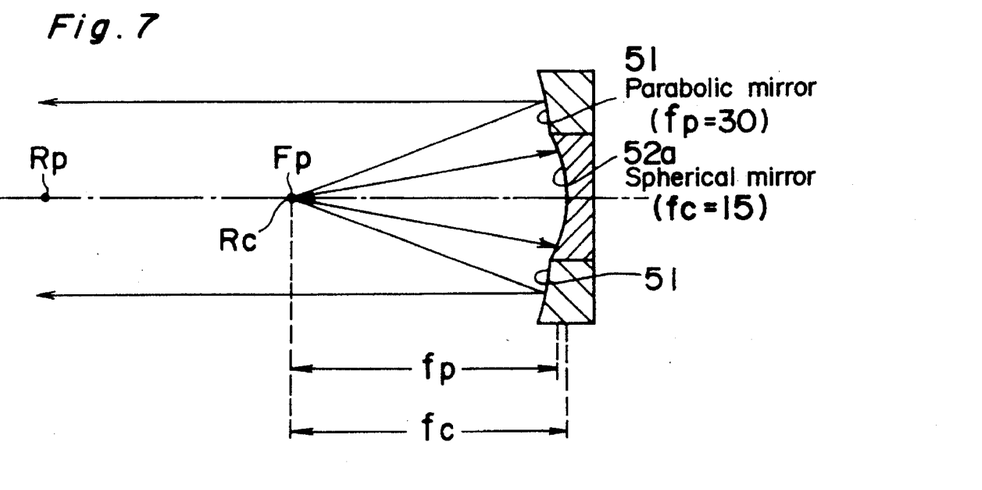
FIG. 7 is a longitudinal cross-sectional view of a main mirror of an optical antenna of the present invention comprising a convex parabolic mirror and a convex spherical mirror.

In the present preferred embodiment, as shown in FIG. 7, the main mirror 1 has not only a parabolic mirror 51 provided on the outer periphery side of the main mirror 1 but also a spherical mirror 52a provided on the inner periphery side of the main mirror 1. In the preferred embodiment of FIG. 7, the focal length fp of the parabolic mirror 51 is equal to 30, and the focal length fp thereof is set to be slightly larger than the focal length fc of the spherical mirror 52a equal to 15. In this case, a beam of transmitting light transmitted from the coincident position Fp=Rc of the focal point Fp and the center of curvature Rc toward the parabolic mirror 51 and the spherical mirror 52a is reflected by the parabolic mirror 51, and then, the transmitting light becomes a collimated parallel light, which is then transmitted toward the optical antenna of the destination station. The transmitting light is further reflected by the spherical mirror 52a, and thereafter, it is returned to the center of curvature Rc along the same optical path. The returned transmitting light is used as a reference optical signal for the alignment adjustment for the optical system in the optical transceiver, as described in detail later.

Further, in the optical antenna 10, a submirror driving mechanism 2d which has been known to those skilled in the art is provided on the rear surface of the submirror 2 being opposite to the mirror surface of the submirror 2. In response to a control signal from an MPU (microprocessing unit) 20, the submirror driving mechanism 2d moves the submirror 2 in a direction parallel to the optical axis CL coincident with the center axis of the optical antenna 10 which is the Z-axis direction of FIGS. 1 and 2 (hereinafter, referred to as a Z-axis direction of the optical antenna 10), and further moves the submirror 2 in two axial directions orthogonal to each other and perpendicular to the optical axis CL, wherein the two axial directions have an origin of the mirror center of the submirror 2. One of the two axial directions is, as shown in FIGS. 1 and 2, a X-axis direction (referred to as an X-axis direction hereinafter) perpendicular to the paper surface of the drawings, and another one thereof is a Y-axis direction (referred to as a Y-axis direction hereinafter) defined on the paper surface of the drawings.

Further, in the optical antenna 10, two-axes gimbals 1d are provided, the angle of which is changed in response to a control signal from the MPU 20, with the two axes in two directions orthogonal to each other which respectively correspond to the X-axis direction and the Y-axis direction of the optical antenna 10 and are parallel to the X-axis direction and the Y-axis direction thereof. Still further, the optical antenna 10 is provided with a hood 3 having a cylindrical shape concentric with the optical axis CL of the optical antenna 10, wherein the hood 3 is formed so as to cover the inner mirror surface of the main mirror 1 and the entire submirror 2, for the purpose of preventing unnecessary signal light from being incident into the inside of the optical antenna 10.

As shown in FIG. 1, the optical system for optically connecting the optical transceiver and the optical antenna 10 comprises the followings:

(a) an eyepiece 4 composed of a single-convex lens 4 and a double-convex lens 4b;
(b) an FPM (fine pointing mirror module) 11;
(c) three beam splitters 12, 13 and 14; and
(d) a PAM (point-ahead mirror module) 15.

The FPM 11 is provided for reflecting a beam of transmitting laser light and a beam of received light so that a beam of returned transmitting light sent from the eyepiece 4 is incident onto a reflecting mirror of the FPM 11 at an incident angle of 45° and then goes out at an outgoing angle of 45° so as to be incident into the beam splitter 12. In the FPM 11, a direction passing through the intersection between the mirror surface of the reflection mirror of the FPM 11 and the optical axis CL and being perpendicular to the paper surface of FIG. 1 is defined as a Y-axis of the FPM 11, while a direction located on the mirror surface of the reflection mirror of the FPM 11 and perpendicular to the Y-axis is defined as an X-axis of the FPM 11. The FPM 11 comprises a driving mechanism (not shown) for rotating the mirror surface of the reflection mirror thereof around the X-axis and Y-axis of the FPM 11 in response to a control signal sent from the MPU 20.

Further, the PAM 15 is provided for reflecting a beam of transmitting light so that a beam of transmitting light generated and transmitted from the laser diode 37 is incident onto a reflection mirror of the PAM 15 at an incident angle of 45° and then goes out at an outgoing angle of 45° so as to be incident into the beam splitter 14. In the PAM 15, a direction passing through the intersection between the mirror surface of the reflection mirror of the PAM 15 and the optical axis CL and being perpendicular to the paper surface of FIG. 1 is defined as a Y-axis of the PAM 15, while a direction located on the mirror surface of the reflection mirror of the PAM 15 and perpendicular to the Y-axis is defined as an X-axis of the PAM 15. The PAM 15 comprises a driving mechanism (not shown) for rotating the mirror surface of the reflection mirror thereof around the X-axis and Y-axis of the PAM 15 in response to a control signal sent from the MPU 20.

In the optical antenna 10, a beam of receiving light received by the optical antenna 10 is reflected by the parabolic mirror 1a of the main mirror 1 and then is directed toward the submirror 2, which then reflects the beam of received light. The beam of received light reflected by the submirror 2 transmits toward the eyepiece 4 approximately in a direction parallel to the optical axis CL.

The beam of received light and the above-mentioned beam of returned transmitting light are incident onto the FPM 11 through the eyepiece 4, and then are reflected by the reflection mirror of the FPM 11. Thereafter, these lights are incident into the beam splitter 12. The beam splitter 12 divides these incident lights into two beams of lights, one of which (referred to as a beam of first light hereinafter) passes through the beam splitter 12 as it is, and another one of which (referred to as a beam of second light hereinafter) is reflected and extracted. A beam of second light reflected by the beam splitter 12 is incident into the CCD sensor 30, while a beam of first light passing through the beam splitter 12 is incident into the next beam splitter 13.

Then the beam splitter 13 divides the incident light into two beams of lights, one of which (referred to as a beam of third light hereinafter) passes through the beam splitter 13 as it is, and another one of which (referred to as a beam of fourth light hereinafter) is reflected and extracted. A beam of fourth light reflected by the beam splitter 13 is incident into the QD sensor 32, while a beam of third light passing through the beam splitter 12 is incident into the next beam splitter 14. Further, the beam splitter 14 then reflects the beam of light incident from the beam splitter 13, and makes the beam of reflected light be incident into a PD sensor (photodiode sensor) 34.

On the other hand, a modulator 36 modulates the transmitting light having a predetermined transmitting wavelength by a predetermined modulation method such as an intensity modulation according to a transmission base band signal inputted from an external apparatus, and then a beam of modulated transmitting light is outputted from the laser diode 37. The beam of modulated transmitting light is reflected by the reflection mirror of the PAM 15, and thereafter, passes sequentially through the three beam splitters 14, 13 and 12, then is incident onto the reflection mirror of the FPM 11. Thereafter, the beam of transmitting light is reflected by the reflection mirror of the FPM 11, and then is projected through the eyepiece 4 onto the submirror 2 of the optical antenna 10.

Figure 3:
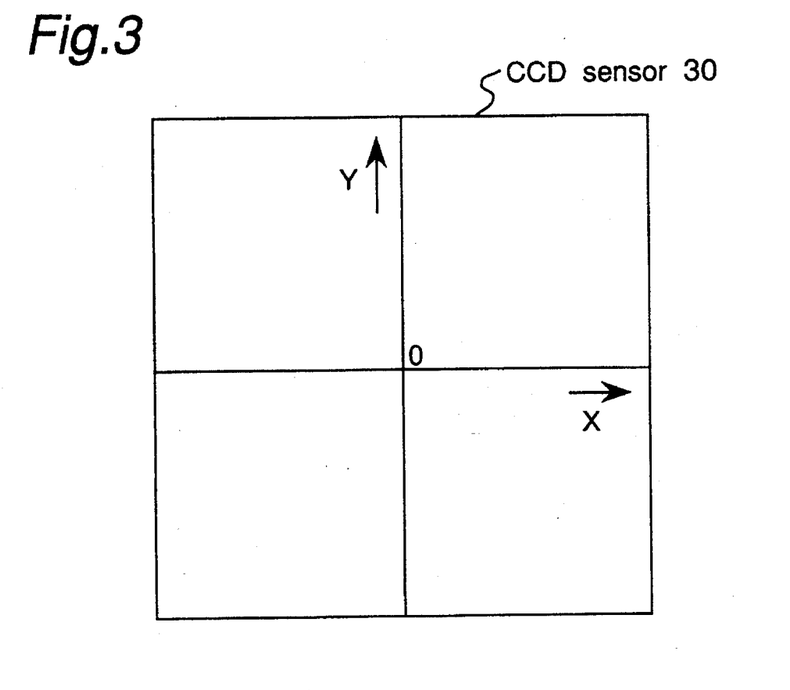
FIG. 3 is a front view of an optical detection surface of a CCD sensor shown in FIG. 1.

The CCD sensor 30, as shown in FIG. 3, has a square-shaped photo-detector plane consisting of an X-axis and a Y-axis corresponding to the X-axis and the Y-axis of the optical antenna 10, respectively. The photo-detector plane of the CCD sensor 30 comprises a plurality of photo-detector cells located at predetermined equal intervals so as to be parallel to the X-axis and the Y-axis, wherein each photo-detector cell is labeled with X and Y coordinates on a plane in a shape of a predetermined grating. The CCD sensor 30 further comprises two band-pass filters (not shown), one of which passes therethrough only the above-mentioned beam of returned transmitting light among the incident lights, and another one of which passes therethrough only the above-mentioned beam of received light among the incident light, namely, the beam of returned transmitting light is separated from the beam of received light. Thereafter, the beam of separated returned transmitting light is detected by the respective photo-detector cell and then is converted into an electric signal, which is outputted to a CCD processing circuit 31, while the beam of separated received light is detected by the respective photo-detector cell and then is converted into an electric signal, which is outputted to the CCD processing circuit 31.

In response to the respective electric signals sequentially outputted from the CCD sensor 30, the CCD processing circuit 31 calculates not only geometrical time-average radius of an image of the beam of returned transmitting light obtained on the photo-detector plane of the CCD sensor 30 but also the maximum value in the light intensity distribution thereof, and then outputs these calculated data to the MPU 20. With respect to the beam of received light, in response to the respective electric signals sequentially outputted from the CCD sensor 30, the CCD processing circuit 31 further outputs to the MPU 20 an error signal representing the amounts of errors in the X-axis direction and the Y-axis direction from the origin O of FIG. 3 corresponding to the optical axis CL. In this case, the data of the time-averaged radius of the image and the maximum value of the intensity of the beam of returned transmitting light includes information of a defocusing amount of the beam of transmitting light in the optical antenna 10.

Meanwhile, in response to the error signal of the beam of received light outputted from the CCD processing circuit 31, the MPU 20 controls the two-axes gimbals 1d so that the beam direction of the optical antenna 10 is directed toward the direction of the optical antenna of the destination station. Further, in the alignment adjustment process which will be described in detail later, the MPU 20 controls the submirror driving mechanism 2d in response to the data of the time-average radius of the beam of returned transmitting light and the maximum value of the distribution of the light intensity thereof which are outputted from the CCD processing circuit 31, so that the inputted time-average radius becomes the minimum value and also the submirror 2 moves forward or backward in the Z-axis direction of the optical antenna 10.

This leads to correction of the defocusing amount of the beam of transmitting light, resulting in no defocusing amount of the beam of transmitting light, namely, in-focus state on the beam of transmitting light. If there is an extremely large defocusing amount of the beam of transmitting light, it is impossible to completely set the in-focus state thereon only by adjustment of the position of the submirror 2 in the Z-axis direction. Therefore, in this case, although not shown, the eyepiece 4 is moved forward or backward in a direction parallel to the optical axis CL by a driving mechanism (not shown) which has been known to those skilled in the art, so that the defocusing amount of the beam of transmitting laser light is corrected, resulting in the in-focus state.

Figure 4:
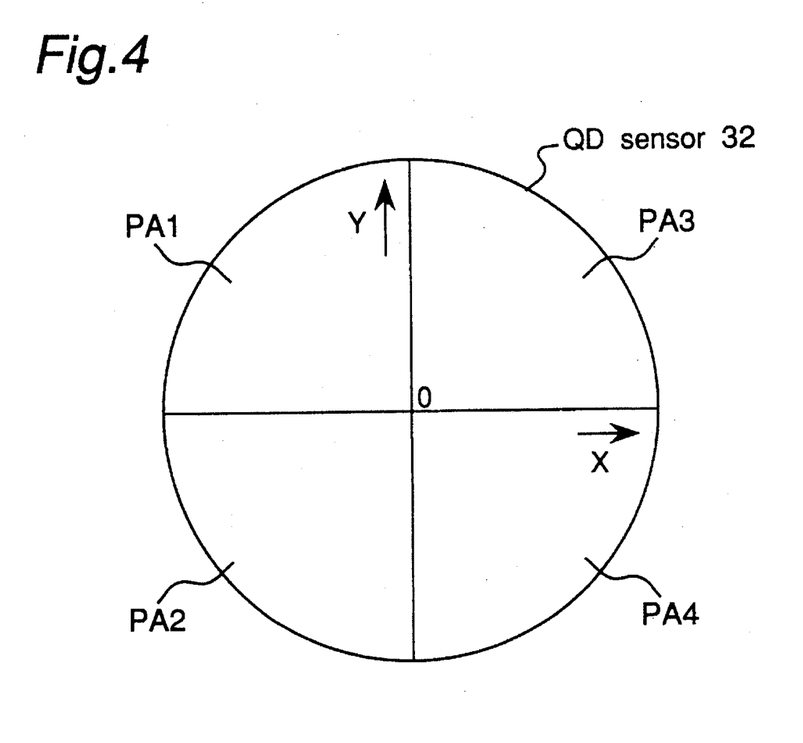
FIG. 4 is a front view of an optical detection surface of a QD sensor shown in FIG. 1.

Further, the QD sensor 32, as shown in FIG. 4, comprises four photodiode cells PA1 to PA4, which are obtained by dividing the sensor surface of the QD sensor 32 into four quadrants with boundary lines of an X-axis and a Y-axis corresponding to the X-axis and the Y-axis of the optical antenna 10, respectively. The first, second, third and fourth quadrant cells are here denoted by PA1, PA2, PA3 and PA4, respectively, as seen from the front side of the QD sensor 32. Each of the photodiode cells PA1 to PA4 comprises two band-pass filters (not shown), one of which passes therethrough only the above-mentioned beam of returned transmitting light among the incident lights, and another one of which passes therethrough only the above-mentioned beam of received light among the incident light, namely, the beam of returned transmitting light is separated from the beam of received light. Thereafter, the beam of separated returned transmitting light is detected by the first group of photodiode cells PA1 to PA4 and then is converted into the first group of electric signals V1 to V4 respectively for the first group of four photodiode cells PA1 to PA4, which are outputted to a QD processing circuit 33, while the beam of separated received light is detected by the second group of photodiode cells PA1 to PA4 and then is converted into the second group of electric signals V1 to V4 respectively for the second group of four photodiode cells PA1 to PA4, which are outputted to the QD processing circuit 33.

In response to the inputted first and second groups of electric signals V1 to V4 with respect to the beam of returned transmitting laser light and the beam of the received light, the QD processing circuit 33 calculates tracking error data $\delta x$ and $\delta y$, each representing not only the direction and the amount of deviation or distance from the optical axis CL (respectively referred to as direction and amount of an axial deviation hereinafter), and then the QD processing circuit 33 outputs the calculated tracking error data $\delta x$ and $\delta y$ to the MPU 20. The tracking error data $\delta x$ and $\delta y$ are represented by the following equations (2) and (3):

$$\delta x = \{(V1+V4)-(V2+V3)\}/(V1+V2+V3+V4) \quad (2),$$

and $$\delta y = \{(V1+V2)-(V3+V4)\}/(V1+V2+V3+V4) \quad (3),$$

for both of the beam of transmitting light and the beam of received light.

In response to the tracking error data $\delta x$ and $\delta y$ of the beam of received light outputted from the QD processing circuit 33, the MPU 20 controls the driving mechanism of the FPM 11 so that a beam of receiving light transmitted from the optical antenna of the destination station can be captured within a predetermined receiving field of view of the PD sensor 34. Further, in the alignment adjustment process which will be described in detail later, in response to the tracking error data $\delta x$ and $\delta y$ of the beam of returned transmitting light outputted from the QD processing circuit 33, the MPU 20 controls the driving mechanism of the PAM 15 so that the tracking error data $\delta x$ and $\delta y$ of the beam of returned transmitting light coincide with the tracking error data $\delta x$ and $\delta y$ of the beam of received light, respectively, and further the mirror surface of the PAM 15 rotates around the X-axis and Y-axis of the PAM 15.

In the pointing, acquisition and tracking system for the optical transceiver with the above-described arrangement, an initial acquisition is performed by receiving a beacon light having a relatively wider field of view which is transmitted from the satellite of the destination station. In this initial acquisition process, the control system detects an error from the tracking center of the luminescent spot of the beacon light outputted from the CCD sensor 30, and then controls the two-axes gimbals 1d coupled with the optical antenna 10 in response to the detected error, so as to direct the beam direction of the optical antenna 10 toward the direction of the satellite of the destination station. Thus, the beacon light is captured within the predetermined field of view of the QD sensor 32, and thereafter, an tracking error in the two directions perpendicular to each other is detected from relative ratios of amounts of lights incident onto the respective photodiode cells of the QD sensor 32. Then, based on the detected tracking error, the control system controls the driving mechanism of the FPM 11 to capture a beam of light transmitted from the satellite of the destination station within the predetermined field of view of the PD sensor 34 for receiving the same. Further, with the use of the PAM 15, a point-ahead angle, which will be described in detail later, is corrected, and then a beam of laser light is transmitted in the above-corrected direction, starting the optical communication with the satellite of the destination station.

It is noted here that the point-ahead in the optical satellite communication performed either between an earth station and a low-earth-orbiting satellite station or between a geostationary satellite station and a low-earth-orbiting satellite station is different from that in general astronomy in the following point. That is, the pointing and tracking system of the optical transceiver is designed so as to track the direction of laser light coming up from the optical antenna of the destination station. However, since the speed of light is a finite value of 300,000 km/sec, the direction of the satellite of the destination station may have changed when the direction of light sent from the optical antenna of the destination station is detected, because of the relative movement therebetween. Further, since it takes a predetermined time for a beam of transmitting light to propagate to the satellite of the destination station, this leads to a deviation of the direction, similarly. In the optical satellite communication performed between a geostationary satellite station and a low-earth-orbiting satellite station, the above-mentioned deviation of the direction becomes approximately several tens micro-radian, which is a value of an order which cannot be neglected in the laser communication involving an accurate tracking having an order of about 1 micro-radian. The point-ahead in astronomy relates to the deviation of the directions of planets as seen from the earth, namely, the deviation of the directions in uni-directional light propagation. On the other hand, in optical satellite communications, a point-ahead takes place in the bi-directional light propagation, which results in a doubled amount of correction.

Figure 8:
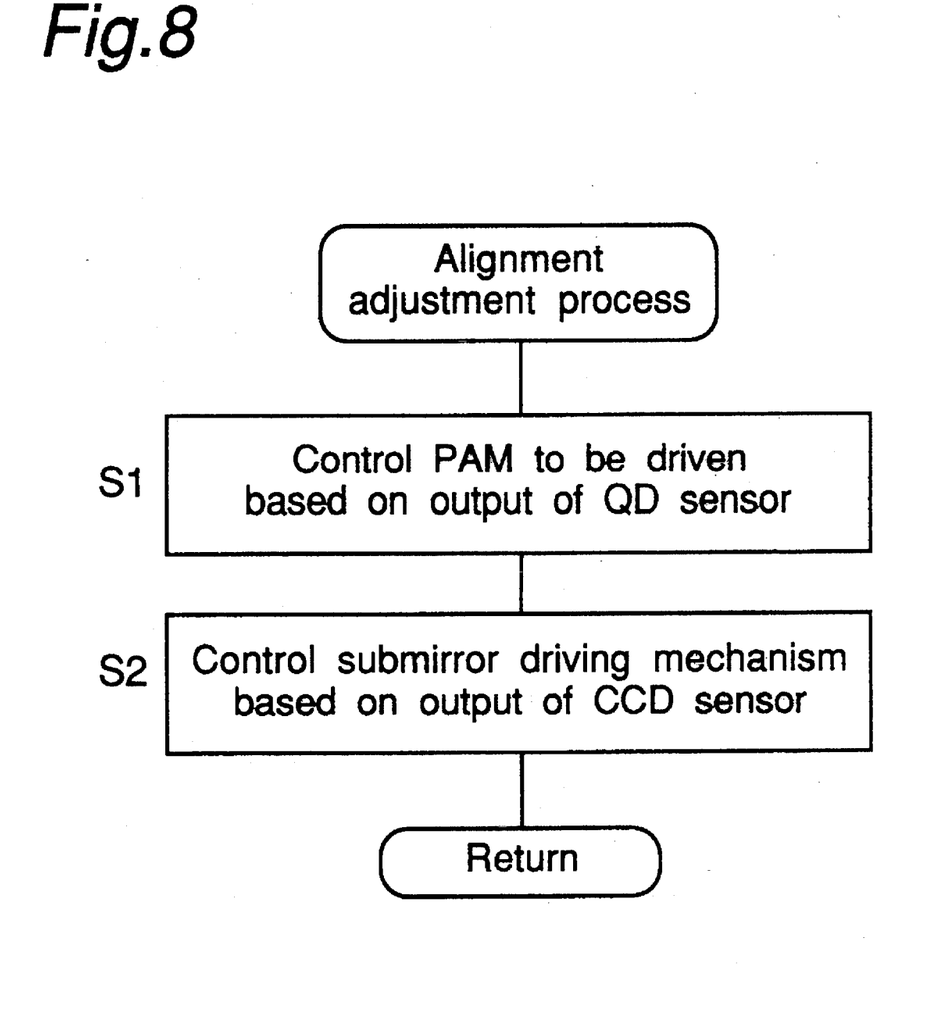
FIG. 8 is a flowchart of a control flow showing an alignment adjusting process which is executed by the adjusting system for the optical system of the optical transceiver shown in FIG. 1.

FIG. 8 is a flow chart of control flow showing the alignment adjustment process executed by the alignment adjusting system for use in the optical system in the optical transceiver shown in FIG. 1. The alignment adjustment process is periodically executed by the MPU 20 thereof at predetermined equal time intervals corresponding to the time constant of change in the temperature of the optical system, for example, once every 10 minutes or the like.

Referring to FIG. 8, in step S1, in response to the tracking error data δx and δy of a beam of return-transmitting light outputted from the QD processing circuit 33, the MPU 20 controls the driving mechanism of the PAM 15 so that the tracking error data 67 x and δy of the beam of returned transmitting light coincide with the tracking error data δx and δy of a beam of received light, respectively, and further the mirror surface of the reflection mirror of the PAM 15 rotates around the X-axis and the Y-axis of the PAM 15. This allows the direction and amount of the axial deviation in the direction perpendicular to the optical axis of the light of transmitting laser light to be corrected, and then, which results in making the optical axis of the beam of transmitting laser light coincident with the optical axis of the beam of received light.

Then, in step S2, in response to the time-average radius data and the maximum value of the intensity of the beam of returned transmitting light outputted from the CCD processing circuit 31, the MPU 20 controls the submirror driving mechanism 2d so that the inputted time-average radius data becomes the minimum value and further the submirror 2 moves forward or backward in the Z-axis direction of the optical antenna 10. As a result, the defocusing amount of the beam of transmitting laser light can be corrected and is adjusted so that there is no defocusing amount, namely, adjusted into the in-focus state of the beam of transmitting laser light with a higher accuracy or preciseness.

Although the wavelength of the beam of transmitting light and that of the beam of received light are made different from each other in the above-mentioned preferred embodiment, the present invention is not limited to this. The wavelength of the beam of transmitting light may be set so as to be the same, substantially the same, or approximately the same as that of the beam of received light, or the wavelength of the beam of transmitting light may be set so as to be extremely close to that of the beam of received light. In this case, these beams of lights are set so that an area or a distribution of the beam of transmitting light is different from that of the beam of received light.

For example, the beam of received light substantially may set so as to exist on the outer periphery of the circular beam spot having a predetermined diameter, and the beam of transmitting light substantially may set so as to exist on the inner periphery of the circular beam spot which is not overlapped on the outer periphery thereof. In this case, in each of the CCD sensor 30 and the QD sensor 32, a shutter mechanism is provided comprising a circular inner-peripheral shutter for shielding the beam of transmitting laser light located on the inner periphery of the circular beam spot, and another ring-shaped outer-peripheral shutter for shielding the beam of received light located on the outer periphery of the circular beam spot. Then, the inner-peripheral shutter and the outer-peripheral shutter are controlled so as to be switched alternately using a time division multiplex based on a predetermined timing signal which is periodically generated. Based on the above-mentioned timing signal, the signal detected by the CCD sensor 30 and the signal detected by the QD sensor 32 are discriminated from each other, and then the discriminated signals are separately extracted. It is noted that the PD sensor 34 always extracts only the beam of received light located on the outer periphery thereof, and then converts the same into the electric signal.

In the optical antenna 10 of the above-mentioned preferred embodiment, the concave parabolic mirror 1a for transmitting and receiving beams of lights is provided on the outer periphery of the main mirror 1, while the spherical return-reflection mirror 1b having the optical through hole 1h for return-reflecting the beam of transmitting laser light is provided on the inner periphery of the main mirror 1.

Figure 9:
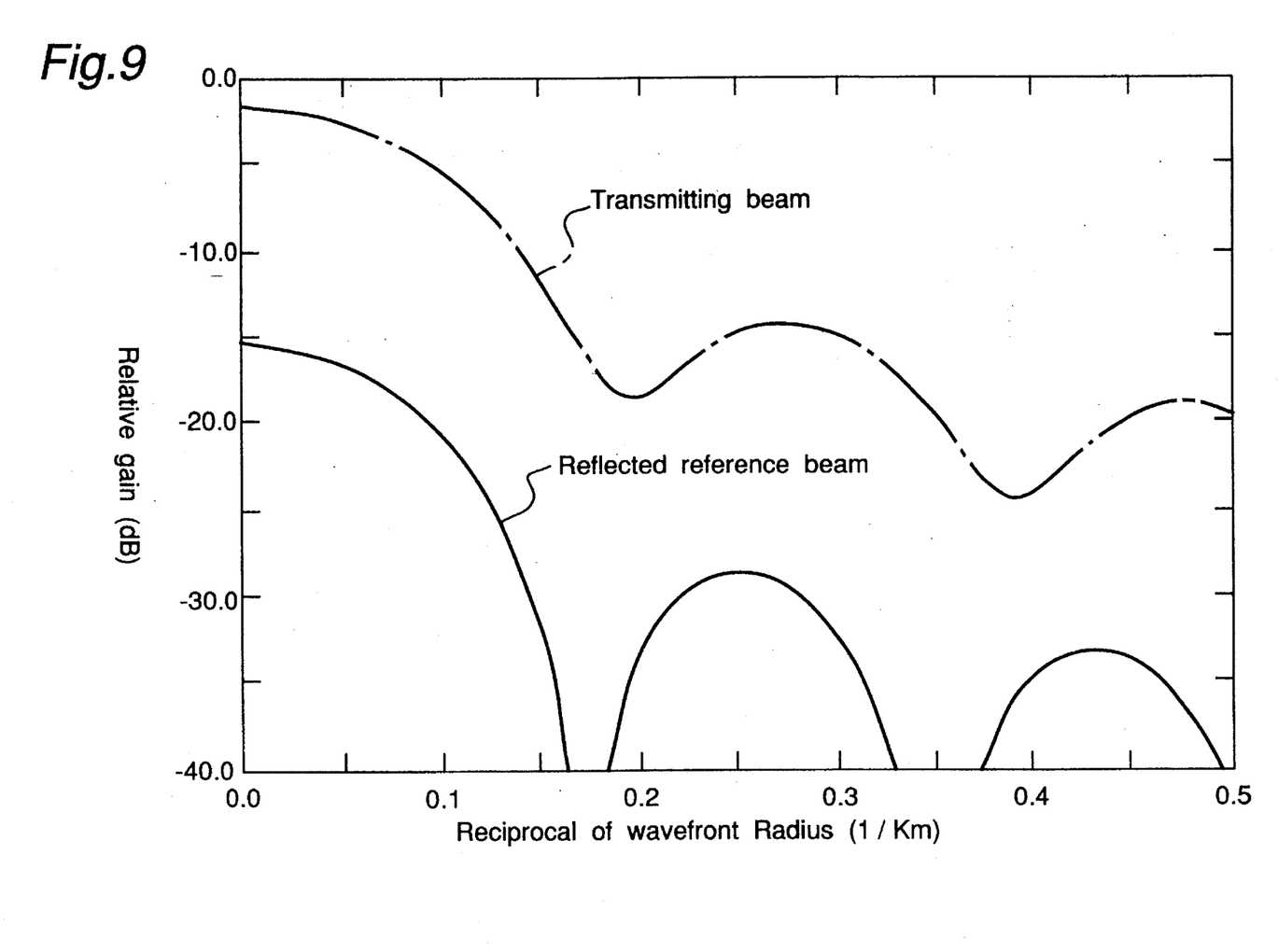
FIG. 9 is a graph showing a relative sensitivity on a reciprocal of a wavefront radius in the preferred embodiment according to the present invention.

FIG. 9 is a graph of a relationship between a gain of transmitting light and a gain of return-reflected transmitting light with a measure of a reciprocal of a wavefront radius [1/km] and a relative gain [dB], showing not only lowering of the relative gain of the optical antenna due to a defocusing in the present preferred embodiment, but also change in the maximum intensity of the beam of returned transmitting laser light.

An alternate long and short dash line of FIG. 9 shows a theoretical calculation result of the antenna gain with respect to the beam of transmitting laser light when an error of a circular-wavefront radius shown in the horizontal axis of FIG. 9 is generated in an aperture part of the optical antenna due to a defocusing, which is obtained with reference to the following document: Bernard J. Klein and John J. Degnan, "Optical Antenna Gain, 1:Transmitting Antennas", Applied Optics, Vol. 13, No. 9, in September, 1974, on the following assumption:

(a) an amplitude distribution of the beam of transmitting laser light is set to a Gaussian distribution;

(b) a diameter of an aperture of the optical antenna is set to 19 cm;

(c) a wavelength of the transmitting laser light is set to 0.83 μm;

(d) a radius of the Gaussian beam in the aperture part of the optical antenna is set to 9.5 cm; and (e) the radius of the submirror is set to 2.25 cm.

Further, the solid line of FIG. 9 shows change in the intensity of the beam of return-reflected transmitting laser light when there is a defocusing similar to the above-mentioned amount. The ring-shaped concave spherical return-reflection mirror 1b has an outer diameter of 2.25 cm and an inner diameter of 1.55 cm. The left end of FIG. 9 corresponds to the state of no defocusing amount, namely, the in-focus state. In comparison between the in-focus state and the case where an error of the circular wavefront radius of 20 km is caused in the aperture part of the optical antenna, namely, the case of a reciprocal of a wavefront radius of 0.05 1/km, the relative gain of the optical antenna decreases by 0.92 dB, and then this corresponds to 1.2 dB lowering of the signal intensity in the CCD sensor 30 with respect to the beam of returned transmitting laser light.

Therefore, for example, if an intensity measurement of the beam of returned transmitting light in the CCD sensor 30 has a preciseness of 20% or less, namely, −1 dB or less, the deterioration amount of the gain of the optical antenna due to defocusing of the beam of transmitting laser light can be prevented from raising more than 1 dB. This sensitivity sufficiently satisfies predetermined requirements for the optical antenna of the optical transceiver.

That is, since the detection sensitivity for the defocusing amount of the optical system is in inverse proportion to the diameter of the spherical return-reflection mirror 1b without the optical through hole 1h, providing the spherical return-reflection mirror 1b is provided on the inner periphery leads to lowering of the detection sensitivity of alignment error. However, the surface which is shielded by the submirror 2 so as to be unusable for a beam of transmitting laser light can be effectively utilized, and this allows the effective diameter of the main mirror 1 to be reduced advantageously.

Further, the concave parabolic mirror 1a for transmitting and receiving beams of lights may be provided on the inner periphery of the main mirror 1, while the spherical return-reflection mirror 1b having the optical through hole 1h for return-reflecting the beam of transmitting laser light may be provided on the outer periphery of the main mirror 1.

In the above-mentioned preferred embodiment, the center-fed cassegrain type optical antenna 10 comprising the main mirror 1 including the concave parabolic mirror 1a for transmitting and receiving beams of lights and the concave spherical return-reflection mirror 1b for return-reflecting a beam of transmitting laser light has been used, the present invention is not limited to this. However, for example, a Richey-Chrétien type optical antenna may be used for the purpose of obtaining a wider tracking angle range. In such a case, in the main mirror 1, a concave hyperbolic mirror having a mirror surface close to a concave parabolic surface may be used for transmitting and receiving beams of lights, while a concave elliptic mirror having a reflection mirror close to a concave spherical mirror may be used for return-reflecting a beam of transmitting light. In this case, the deformation parameter K of the former hyperbolic mirror is preferably in a range of $-0.1<K<0$, and the deformation parameter K of the latter elliptic mirror is preferably in a range of $0.9<K<1.0$.

In the above-mentioned preferred embodiment, the main mirror 1 is provided together with a mirror surface for return-reflecting a beam of light, whereby alignment adjustment can be achieved for arrangement of the devices located over from the optical transceiver through the optical system to the submirror 2 and the main mirror 1. However, the present invention is not limited to this arrangement. A mirror surface for return-reflecting a beam of transmitting light may be provided in the submirror 2. In this case, a reflection mirror having such mirror surface for return-reflecting a beam of light is required only to be either a spherical surface or an elliptic surface close to a spherical surface, wherein the reflection mirror is provided on the inner peripheral portion or the outer peripheral portion of the submirror 2. In this modification example, the submirror 2 is a convex hyperbolic mirror, while the reflection mirror for return-reflecting a beam of light is either a concave spherical mirror or a nearly-spherical concave elliptic mirror formed integrally together with the submirror 2 and concentrically with the submirror 2 around the optical axis CL. With this arrangement, alignment adjustment can be achieved for arrangement of the devices located over the area from the optical transceiver through the optical system to the submirror 2. Furthermore, in the case where the main mirror 1 and the submirror 2 are mechanically coupled with each other and further an accurate alignment adjustment is achieved therefor, alignment adjustment can be achieved for arrangement of the devices located over the area up to the submirror 2 and the main mirror 1 through the optical system.

Although the optical antenna is used for bi-directional optical transceiver in the above-mentioned preferred embodiment, the present invention is not limited to this. The present invention may be applied to a uni-directional optical transmitter intended for only transmission or an optical broadcasting transmitter intended for only transmission.

Although the communication signals of the wavelength region of light are used in the above-mentioned preferred embodiment, the present invention is not limited to this. The present invention may be applied to transceiver or broadcasting apparatus which employ communication signals of a frequency band of microwave, semi-millimeter wave, millimeter wave, or the like.

By the arrangement of the above-mentioned preferred embodiments, when the reflection mirror for return-reflecting a beam of transmitting light is provided in the main mirror, the defocusing amount of the beam of transmitting laser light can be corrected so as to be substantially zero over the optical system from the optical transceiver through the optical coupling or connection means to the submirror and the main mirror of the optical antenna. On the other hand, when the reflection mirror for return-reflecting a beam of transmitting light is provided in the submirror, the defocusing amount of the beam of transmitting laser light can be corrected so as to be substantially zero over the optical system from the transceiver through the optical coupling or connection means to the submirror of the optical antenna. As a result, the size of the alignment adjusting system for use in the optical system in the optical transceiver of the present invention can be made smaller and the weight thereof can be made smaller than those of the conventional apparatuses, and further the present invention is capable of adjusting arrangement of the optical system located from the optical transceiver through the optical coupling or connection means to the submirror or the main mirror of the optical antenna with a higher accuracy. The provision of the alignment adjusting system allows the main mirror and the submirror to be made of light-weight metal materials each having a relatively smaller specific gravity and a relatively larger thermal conductivity, such as Al, Mg, Be or the like. Accordingly, the weight of the satellite in which the optical transceiver is provided can be advantageously and remarkably reduced.

By the arrangement of the above-mentioned preferred embodiment, when the reflection mirror for return-reflecting a beam of transmitting laser light is provided in the main mirror, the deviation amount of the beam of transmitting light from the optical axis of the optical system can be corrected so that the optical axis coincides with that of the beam of received light, over the optical system from the optical transceiver through the optical coupling or connection means to the submirror and the main mirror of the optical antenna. On the other hand, when the reflection mirror for return-reflecting a beam of transmitting light is provided in the submirror, the deviation amount of the beam of transmitting laser light from the optical axis of the optical system can be corrected so that the optical axis of the beam of transmitting light coincides with that of the beam of received light, over the optical system from the optical transceiver through the optical coupling or connection means to the submirror of the optical antenna. Accordingly, the size of the alignment adjusting system for use in the optical system in the optical transceiver of the present invention can be made smaller and the weight thereof can be made smaller than those of the conventional apparatuses, and further the present invention is capable of adjusting arrangement of the optical system from the optical transceiver through the optical coupling or connection means to the submirror or the main mirror of the optical antenna with a higher accuracy.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An alignment adjusting system for use in an optical system in an optical transceiver, comprising:

an optical antenna having a main mirror and a submirror, both of which being provided around an optical axis of said optical antenna and away from each other by a predetermined interval, said optical antenna transmitting a beam of transmitting light output from said optical transceiver to an optical antenna of a destination station after sequentially reflecting said beam of transmitting light by said submirror and said main mirror;

an optical coupling means for optically coupling said optical antenna to said optical transceiver;

a return-reflection mirror for return-reflecting a part of said beam of transmitting light output from said optical transceiver;

first detection means for detecting a defocusing amount of said beam of transmitting light in said optical antenna, in response to said beam of transmitting light return-reflected by said return-reflection mirror;

first moving means for moving said submirror in a direction parallel to the optical axis of said optical antenna; and first control means for controlling said first moving means so that the defocusing amount of said beam of transmitting light becomes substantially zero, in response to a defocusing amount of said beam of transmitting light in said optical antenna which is detected by said first detection means, wherein said main mirror is either one of a ring-shaped concave parabolic mirror and a ring-shaped concave nearly-parabolic hyperbolic mirror;

said return-reflection mirror is either one of a ring-shaped concave spherical mirror and a ring-shaped concave nearly-spherical elliptical mirror, said return-reflection mirror being formed integrally together with said main mirror and concentrically with said main mirror around the optical axis of said optical antenna so that a mirror surface of said return-reflection mirror crosses a mirror surface of said main mirror; and said main mirror and said return-reflection mirror are arranged so that a focal point of said main mirror coincides with the center of curvature of said return-reflection mirror.

2. The alignment adjusting system as claimed in claim 1, wherein said optical antenna sequentially reflects a beam of received light received from said optical antenna of said destination station by said main mirror and said submirror, and thereafter, outputs said beam of reflected light to said optical transceiver through said optical coupling means; and said alignment adjusting system further comprising:

second detection means for detecting a deviation amount of said beam of transmitting light from the optical axis of said optical antenna, in response to said beam of transmitting light return-reflected by said return-reflection mirror;

third detection means for detecting a deviation amount of said beam of received light from the optical axis of said optical antenna in response to said beam of received light reflected by said submirror;

second moving means for moving the optical axis of said beam of transmitting light transmitting in said optical coupling means, said second moving means being provided in said optical coupling means; and second control means for controlling said second moving means so that the deviation amount of said beam of transmitting light from the optical axis of said optical antenna coincides with the deviation amount of said beam of received light from the optical axis of said optical antenna, in response to the deviation amount of said beam of transmitting light from the optical axis of said optical antenna which is detected by said second detection means and the deviation amount of said beam of received light from the optical axis of said optical antenna which is detected by said third detection means.

3. The alignment adjusting system as claimed in claim 1, wherein said main mirror is provided on an outer periphery of a ring-shaped body, while said return-reflection mirror is provided on an inner periphery of said ring-shaped body, and said return-reflection mirror has an optical through hole for passing said beam of transmitting light and said beam of received light therethrough, said optical through hole having a center coinciding with the optical axis of said optical antenna, said optical through hole being formed so as to be concentric with said main mirror around the optical axis of said optical antenna.

4. The alignment adjusting system as claimed in claim 2, wherein said main mirror is provided on an outer periphery of a ring-shaped body, while said return-reflection mirror is provided on an inner periphery of said ring-shaped body, and said return-reflection mirror has an optical through hole for passing said beam of transmitting light and said beam of received light therethrough, said optical through hole having a center coinciding with the optical axis of said optical antenna, said optical through hole being formed so as to be concentric with said main mirror around the optical axis of said optical antenna.

5. A method for adjusting alignment of an optical system in an optical transceiver, comprising the steps of:

providing a main mirror and a submirror of an optical antenna around an optical axis of said optical antenna;

positioning said main mirror and said submirror away from each other;

optically coupling a beam of transmitting light from said optical transceiver to said optical antenna through an optical coupling system;

sequentially reflecting said beam of transmitting light by said submirror and said main mirror;

transmitting said beam of transmitting light from said optical antenna to an optical antenna of a destination station;

return-reflecting a part of said beam of transmitting light via a return-reflection mirror and outputting a return-reflected beam from said optical antenna;

optically coupling said return-reflected beam from said optical antenna to said optical transceiver through said optical coupling system;

sequentially reflecting a beam of received light from said optical antenna of said destination station by said main mirror and said submirror;

optically coupling said beam of reflected light from said optical antenna to said optical transceiver through said optical coupling system;

detecting a first deviation amount of said beam of transmitting light from the optical axis of said optical antenna in response to said return-reflected beam;

detecting a second deviation amount of said beam of received light from the optical axis of said optical antenna in response to said beam of received light reflected by said submirror;

moving the optical axis of said beam of transmitting light transmitting in said optical coupling system;

controlling said moving of the optical axis so that said first deviation amount coincides with said second deviation amount;

detecting a defocusing amount of said beam of transmitting light in said optical antenna in response to said return-reflected beam;

moving said submirror relative to said main mirror in a direction parallel to the optical axis of said optical antenna in response to said defocusing amount; and controlling said moving of said submirror so that said defocusing amount becomes substantially zero.

6. The method for adjusting alignment as claimed in claim 5, further comprising, after said providing step, arranging said main mirror and said return-reflection mirror so that a focal point of said main mirror coincides with the center of curvature of said return-reflection mirror.

7. The method for adjusting alignment as claimed in claim 5, wherein, when said return-reflection mirror is integral with said main mirror, said controlling of said moving of the optical axis of said beam of transmitting light results in the optical axis of the beam of transmitting light coinciding with the optical axis of the beam of received light, from said optical transceiver through said optical coupling system to said submirror and said main mirror.

* * * * *